(12) United States Patent
Spindler et al.

(10) Patent No.: US 8,651,264 B2
(45) Date of Patent: Feb. 18, 2014

(54) TRANSPORT DEVICE AND METHOD FOR THE TRANSPORT OF ARTICLES

(75) Inventors: Herbert Spindler, Riedering (DE); Karl Rausch, Simmern (DE); Josef Mayer, Prien am Chiemsee (DE); Martin Bauer, Nidderau (DE); Josef Unterseher, Rohrdorf (DE)

(73) Assignee: Krones AG, Neutraubling (DE)

( * ) Notice: Subject to any disclaimer, the term of this patent is extended or adjusted under 35 U.S.C. 154(b) by 330 days.

(21) Appl. No.: 12/583,858

(22) Filed: Aug. 27, 2009

(65) Prior Publication Data

US 2010/0051417 A1    Mar. 4, 2010

(30) Foreign Application Priority Data

Aug. 27, 2008 (DE) .......................... 10 2008 039 970

(51) Int. Cl.
*B65G 27/00* (2006.01)

(52) U.S. Cl.
USPC ........ 198/446; 198/442; 198/444; 198/836.3; 53/543

(58) Field of Classification Search
USPC .................. 198/446, 442, 444, 836.3; 53/543
See application file for complete search history.

(56) References Cited

U.S. PATENT DOCUMENTS

| | | | |
|---|---|---|---|
| 2,951,574 A | 9/1960 | Craig | 198/30 |
| 3,194,382 A | 7/1965 | Nigrelli et al. | 198/34 |
| 3,500,982 A * | 3/1970 | Belk | 198/436 |
| 3,554,353 A | 1/1971 | Raudat | 198/30 |
| 4,042,100 A * | 8/1977 | Morrone | 198/446 |
| 4,880,104 A * | 11/1989 | Evans et al. | 198/445 |
| 5,056,298 A * | 10/1991 | Deadmond | 53/534 |
| 5,137,140 A * | 8/1992 | Lecrone | 198/732 |
| 5,515,668 A * | 5/1996 | Hunt et al. | 53/543 |
| 5,546,734 A * | 8/1996 | Moncrief et al. | 53/534 |
| 6,029,424 A | 2/2000 | McEvoy et al. | 53/443 |
| 6,209,707 B1 * | 4/2001 | Ronchi | 198/445 |
| 6,282,864 B1 * | 9/2001 | Janen | 53/48.8 |
| 6,776,278 B1 * | 8/2004 | Gross et al. | 198/416 |
| 7,086,521 B1 * | 8/2006 | Pearce et al. | 198/456 |
| 7,207,428 B2 | 4/2007 | Huettner | 198/444 |
| 7,392,632 B2 * | 7/2008 | Wiedemann et al. | 53/147 |
| 7,607,531 B2 * | 10/2009 | Bonhomme et al. | 198/452 |
| 7,617,926 B2 * | 11/2009 | Jacob et al. | 198/836.3 |

(Continued)

FOREIGN PATENT DOCUMENTS

DE        33 36 988 A1    5/1985
DE        296 17 148 U1   10/1997

(Continued)

OTHER PUBLICATIONS

Brief Translation of DE 296 17 148 (1 page).

*Primary Examiner* — Joseph Dillon, Jr.
(74) *Attorney, Agent, or Firm* — Davidson, Davidson, Kappel, LLC (57) ABSTRACT

A transport device and a method for the transport of articles are disclosed. The transport device is provided with a plurality of single lanes for the single articles having a width (BE). Each single lane is provided with one separating element. Adjacent single lanes are separated by one of the separating elements. The widths (BE) are adjustable with at least one displacing means. At least two adjacent single lanes form a group of lanes with a width (BG). Several of the groups of lanes formed in such a way are slidable to each other. The widths are adjustable with at least a further displacing means.

17 Claims, 8 Drawing Sheets

(56) References Cited

U.S. PATENT DOCUMENTS

| | | | |
|---|---|---|---|
| 8,235,201 B2* | 8/2012 | Miller et al. | 198/419.3 |
| 2005/0217974 A1 | 10/2005 | Huttner | 198/442 |
| 2006/0163043 A1* | 7/2006 | Ranger | 198/861.1 |
| 2009/0223782 A1* | 9/2009 | Martin et al. | 198/617 |
| 2012/0097505 A1* | 4/2012 | Berger et al. | 198/836.3 |

FOREIGN PATENT DOCUMENTS

| | | |
|---|---|---|
| DE | 202 08 127 U1 | 1/2003 |
| DE | 101 46 447 C1 | 4/2003 |
| EP | 0 962 406 A2 | 12/1999 |
| GB | 922791 | 4/1963 |
| WO | WO 2007/102917 A2 | 9/2007 |

* cited by examiner

TRANSPORT DEVICE AND METHOD FOR THE TRANSPORT OF ARTICLES

This claims the benefit of German Patent Application No. DE 10 2008 039 970.1, filed on Aug. 27, 2008, and hereby incorporated by reference herein.

The present invention relates to a transport device for the transport of articles in single lanes. Each single lane is provided with a separating element and adjacent single lanes are separated by one of the separating elements. At least one displacing means is designed, with which the respective widths of the single lanes are adjustable with respect to a transport direction of the transport device in a transverse manner.

The present invention also relates to a method for the transport of articles. In particular, the present invention relates to a method for the transport of articles in a plurality of single lanes, wherein the dimensions and forms of the articles arriving on the transport device are determined. The widths of the single lanes within each group of lanes are adjusted on the basis of the determined forms and dimensions of the arriving articles.

BACKGROUND

U.S. Pat. No. 3,194,382 A discloses an apparatus for arranging and transporting a plurality of articles, wherein the articles are transported in rows on a plurality of conveyor belts. A row of articles is transported on a single conveyor belt whose width is lesser than the diameter of the respective articles. The widths of the single conveyor belts are the same. The articles are arranged in groups, wherein a single group ranges over all single conveyor belts and lanes respectively and the same number of articles is arranged in each lane. The groups of articles are spaced apart from each other in transport direction.

International Patent Application WO 2007/102917 A2 discloses a packaging apparatus with a conveyor belt and a plurality of lanes. The lanes run along a first axis on a first section of the conveyor belt. The lanes of the first section lead in lanes of a second section following the first section. The lanes run along a second axis in the second section. By adjustment of the angle between the first axis and the second axis, the widths of each lane in the second section are adjusted user-defined, but consistently for all lanes.

German Patent Application DE 33 36 988 A1 discloses a bottle conveyor for transporting a plurality of articles, bottles in particular. The articles are transported in lanes on a plurality of conveyor belts. A lane is provided on a single conveyor belt, wherein the single conveyor belt is guided via a guide rail. The widths of the lanes are adjusted for articles of different sizes in such a way that the clearance in between the guide rails is adjusted to the transport direction in a transverse manner. The widths of the lanes are the same for all lanes.

U.S. Pat. No. 2,951,574 A discloses a bottling device, wherein a plurality of bottles are transported on a matting conveyor. The matting conveyor is provided with lanes, in which the bottles are transported consecutively in rows. The widths of the lanes are adjusted for articles of different sizes in such a way onto a certain width that above the matting conveyor a shearing arrangement is adjusted. The widths of the lanes are the same for all lanes.

SUMMARY OF THE INVENTION

It is an object of the invention to provide a transport device for articles of different dimensions and forms, wherein the transport device is easily and quickly adjustable onto the articles transported in the lanes and articles of different dimensions and forms are transportable at the same time.

The present invention provides a transport device comprising:
 a plurality of single lanes for the single articles, each of the single lanes having a width, and each of the articles being consecutively arranged in the single lanes;
 a separating element is provided for each single lane, adjacent single lanes being separated by one of the separating elements;
 at least one displacing means for adjusting the respective widths of the single lanes in a transverse manner to a transport direction of the transport device;
 at least two adjacent single lanes form a group of lanes with a width; and
 the at least one displacing means is adapted to adjust the respective widths of the groups of lanes in a transverse manner with respect to the transport direction.

A further object of the invention is to create a method for the transport of articles of different dimensions and forms in a plurality of single lanes, wherein the transport device is easily and quickly adjustable on the articles transported in lanes and articles of different dimensions and forms are transported at the same time.

The present invention also provides a method comprising the steps:
 determining the dimensions and forms of articles arriving on a transport device, wherein the single articles are transported in a plurality of single lanes with one width;
 arranging the single lanes in the group of lanes due to the determined forms and dimensions of the arriving articles; and
 adjusting the widths of the single lanes within each group of lanes due to the determined forms and dimensions of the arriving articles.

The present invention discloses a transport device for the transport of articles on a transport means. The articles can be bottles for beverages or beverage cans, for example, or any other articles which can be transported with the transport device. The transport device is provided with a plurality of single lanes for the single articles and the single lanes having a width. The articles are consecutively arranged on the single lanes. Each single lane is provided with a separating element so that the articles can be transported in the lanes in a stable manner. Adjacent single lanes are accordingly separated by one of the separating elements.

The transport device is designed with at least one displacing means with which the respective widths of the single lanes are adjustable to a transport direction of the transport device in a transverse manner. Besides, at least two adjacent single lanes can form one group of lanes. These groups of lanes, which are formed in such a way, are slidable relative to each other. For this purpose, the at least one displacing means is adapted to that the respective widths of the groups of lanes are adjustable to the transport direction in a transverse manner.

The widths of the single lanes can be furthermore adjusted the same for all lanes by the at least one displacing means. Alternatively and in addition, the widths of the single lanes can be differently adjusted in groups, however, by means of the displacing means. Depending on the number of displacing means used, it is possible to form as many groups with different widths and/or single lanes with the same width as possible.

In this way, two single lanes transporting no articles can be pushed together in regular clearances, for example. In contrast thereto wide single lanes result thereof, on which articles having a suitable width can be transported.

In another embodiment of the invention, articles are transported on all single lanes, the widths of the single lanes, however, are different so that articles of different widths can be transported in the single lanes having the respective widths.

The transport means of the transport device can be designed as a matting conveyor of a single piece covering all single lanes. Such a matting conveyor should be preferably dimensionally stable with regard to adjustments transverse to the transport direction of the transport device. In a preferred embodiment of the invention, the transport device includes a plurality of single conveyor belts, wherein each single conveyor belt is provided for a lane. In a further embodiment of the invention, the transport means includes a plurality of guide rails onto which the articles are transported. Thereby, a lane is provided for each guide rail. It is obvious for a skilled person, however, that further transport means may be used from the prior art without leaving the scope of the present invention. When choosing the appropriate transport means, the resulting upper limits and lower limits for this purpose are to be respected for the widths of the single lanes. A matting conveyor of a single piece can, for example, buckle the single lanes because of too big width differences. If the single lanes are too broad, the guide rails or single conveyor belts cannot transport the articles no longer secure from tilting and/or the speed of the guide rails or of the single conveyor belts is undesirably reduced.

In a preferred embodiment of the invention, the widths of the single lanes and/or the widths of the groups of lanes are steplessly variable with the displacing means. For this purpose, the displacing means can include, for example, shafts with a plurality of spindles. Thereby, the spindles are arranged on the shafts in such a way that they are situated in between the respective group of lanes. Particularly, the spindles can consist in each case of two sections drivable in the opposite sense. By driving all spindles in the opposite sense of a respective shaft, the widths of the respective groups of lanes are reduced or extended. Thereby, the widths of the groups of lanes of the appropriate respective shaft are consistently the same. If this principle is applied on all groups of lanes with the appropriate respective shafts, finally different widths of single lanes result thereof.

In a further embodiment of the invention, at least two single lanes of at least one group of lane form a combined lane whose width is at least the totaled widths of the at least two single lanes of the at least one group of lane. The separating elements situated in between the single lanes of the combined lanes, which are formed in such a way, are removed, so that comparatively broad articles can be transported on the combined lanes, which are formed in such a way. If the transport means includes guide rails or single conveyor belts then a respective broad article is transported on the respective combined lane on at least two guide rails or single conveyor belts.

In a simple embodiment of the invention, at least two single lanes form a group of lane. A first shaft and a second shaft are provided. The displacing means at the first shaft are positioned after all even-numbered single lanes and the displacing means at the second shaft are positioned after all odd-numbered single lanes. Vice versa and without limiting the invention it is also obvious that the displacing means at the first shaft can be positioned after all odd-numbered single lanes and the displacing means at the second shaft can be positioned after all even-numbered single lanes.

The present invention also discloses a method for the transport of articles. In a first step, the dimensions and forms of arriving articles on a transport device are determined. Since the articles can be different, also the respective dimensions and forms of the articles can be different according to that. The single articles are also transported in a plurality of single lanes. In the further steps, the single lanes are arranged in groups of lanes due to the determined dimensions and forms of the arriving articles. Thereby, different types of groups of articles can be formed and whole groups of lanes can be slid. In a final step of the method, the widths of the single lanes within each group of lane are slid due to the determined dimensions and forms of the arriving articles.

In a simple embodiment of the method, the single lanes are arranged in groups of lanes due to the determined dimensions and forms of the articles by adjusting the displacing means of the first shaft. Further groupings are not carried out. The displacing means at the first shaft are positioned after all even-numbered single lanes. Then the widths of two single lanes within each group of lane are adjusted by the displacing means of the second shaft. For this purpose, the displacing means at the second shaft are positioned after all odd-numbered single lanes. As already described above, the displacing means can be also positioned at the respective shafts after all versed ordinal numbers.

BRIEF DESCRIPTION OF THE DRAWINGS

In the following, embodiments of the invention and its advantages should be explained in greater detail according to the accompanying figures.

Further features, objects and advantages of the present invention will now be explained in greater detail in the following description which should not be regarded as limiting the invention and which refers to the accompanying figures. Same reference numbers refer to same elements throughout the various figures and are not explained repeatedly.

DETAILED DESCRIPTION

Figure 1:
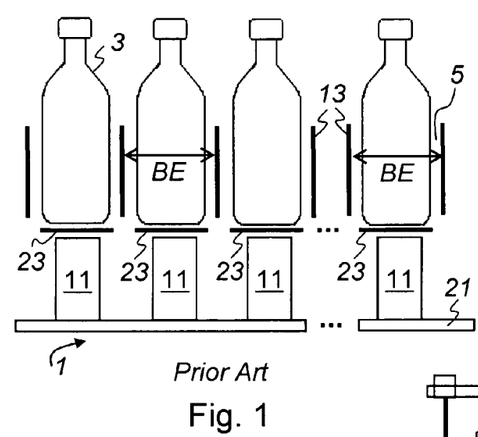
FIG. 1 shows a schematic front view of a portion of a transport device with single conveyor belts according to the prior art.

FIG. 1 shows a schematic front view of a portion of a transport device 1 with a transport means 23 being designed as a plurality of single conveyor belts according to the prior art. The single conveyor belts rest on lane carriers 11 and forms single lanes 5 together with separating elements 13, in which articles 3 are transported. The single lanes 5 have the same width BE. A frame 21 connects the lane carriers 11.

Figure 2:
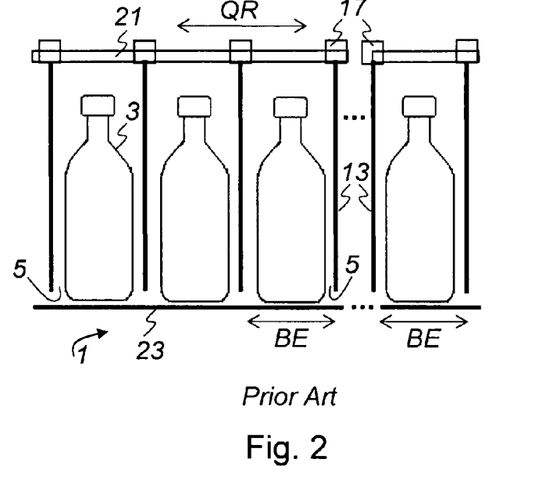
FIG. 2 shows a schematic front view of a portion of a transport device with a one-piece matting conveyor according to the prior art, wherein the single lanes are formed by separating elements.

FIG. 2 shows a schematic front view of a portion of a transport device 1 according to the prior art with a transport means 23 being designed as a matting conveyor of a single piece. The matting conveyor is situated underneath all single lanes 5. The separating elements 13 are positioned at a frame 21 above the articles 3 in the single lanes 5. The single lanes 5 also have the same width BE. The separating elements 13 can be slid in a direction QR to the transport direction TR (not shown) in a transverse manner with the displacing means 17 and thus the widths BE of the single lanes 5 can be adjusted.

Figure 3:
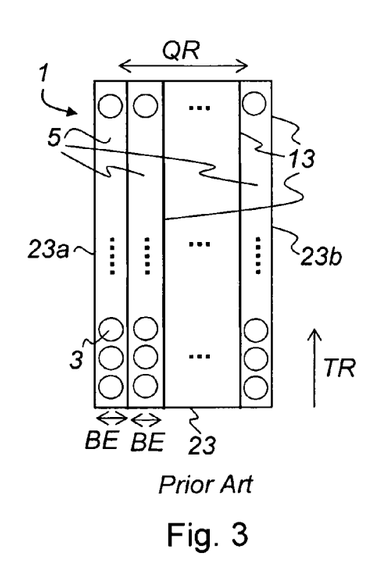
FIG. 3 shows a schematic top view of a portion of a transport device with single lanes having the same width according to the prior art.

FIG. 3 shows a schematic top view of a portion of a transport device 1 with single lanes 5 of the same width BE on a transport means 23 according to the prior art. The articles 3 are transported through the single lanes 5 in transport direction TR.

In FIGS. 4, 5, 6 and 7, several examples for the transport of articles having different dimensions and forms as well as possibilities for the creation of groups of lanes 7 from single lanes 5 are shown. Thereby, still the same embodiment of the transport device 1 according to the invention is used. Instead, the technical details for the design of the single elements of the transport device 1 are not shown here. In FIGS. 4 to 7 only those elements are described in detail, which have not been described in the figures beforehand.

Figure 4:
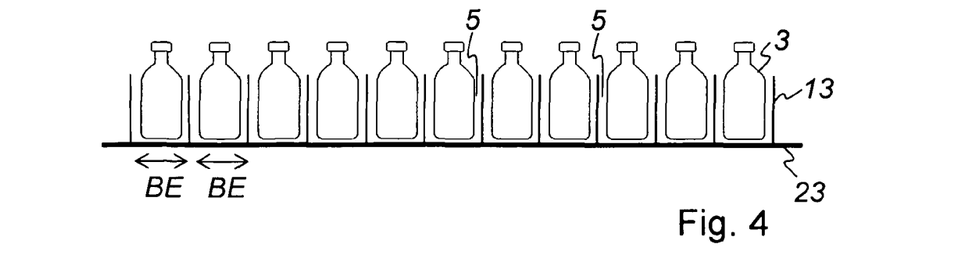
FIG. 4 shows a further schematic front view of a portion of a transport device according to the invention with single lanes having the same width.

FIG. 4 shows a further schematic front view of a portion of a transport device 1 with single lanes 5 having the same width BE.

Figure 5:
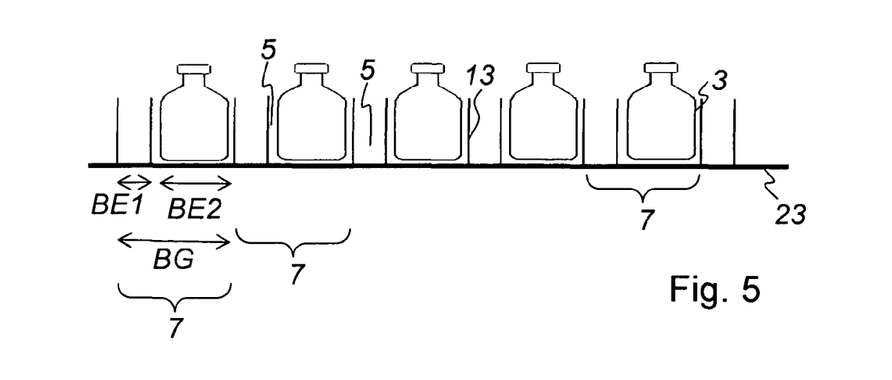
FIG. 5 shows a schematic front view of the portion of the transport device according to FIG. 4 with grouped single lanes having a different width according to the present invention, wherein the narrow single lanes are not used.

FIG. 5 shows a schematic top view of the portion of the transport device 1 according to FIG. 4 with grouped single lanes 5 having a different width BE1 and BE2 according to the present invention. The narrow single lanes 5 with the width BE1 are not used for transport. The articles 3 are transported on the broad single lanes 5 with the width BE2. According to the simple embodiment described above only one type of groups of lanes 7 exists which consists of exactly two single lanes 5 each having the width BE1 and BE2 respectively. The widths BG of the groups of lanes 7 are at least the sum of BE1 and BE2.

In this way, broad articles 3 can be transported with the transport device 1 in the remaining broader single lanes 5 by narrowing every second single lane 5 to one narrow single lane 5 with the width BE1. Because the separating elements 13 are not, as explained in the prior art, consistently moved apart along direction QR when broadening the single lanes 5, a further advantage of the invention ensures that according to the invention the sum of all widths BE of the single lanes 5 is lesser or the same than the width of the transport means 23 with the transport device 1. Thus, no separating elements 13 and/or single lanes 5 can protrude in the present invention from over both edges 23a, 23b along the transport direction TR of the transport means 23 and with it be useless for the transport of articles 3 (see FIG. 3).

Figure 6:
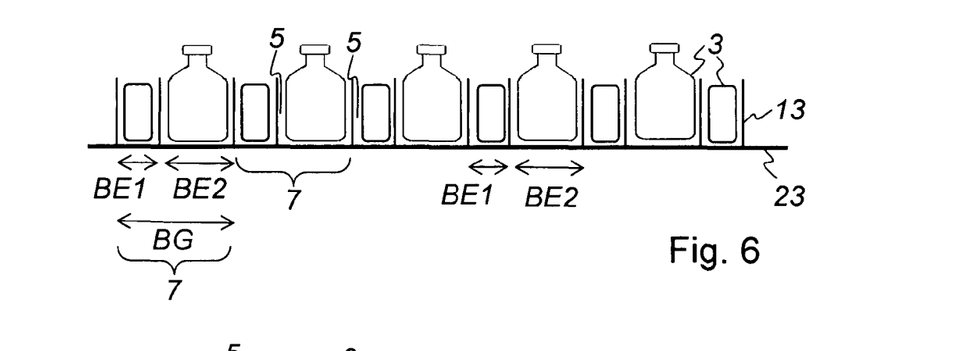
FIG. 6 shows a schematic front view of the portion of the transport device according to FIG. 4 with grouped single lanes having a different width according to the present invention, wherein the narrow single lanes are used for narrow articles.

FIG. 6 shows a schematic front view of the portion of the transport device 1 according to FIG. 4 with grouped single lanes 5 having a different width BE1 and BE2 as with FIG. 5, with the difference that the narrow single lanes 5, too, are used here for the transport of narrow articles 3. In this way, for example, a narrow and a broad article 3 could be packed to a packing unit, in a subsequent packaging unit.

Figure 7:
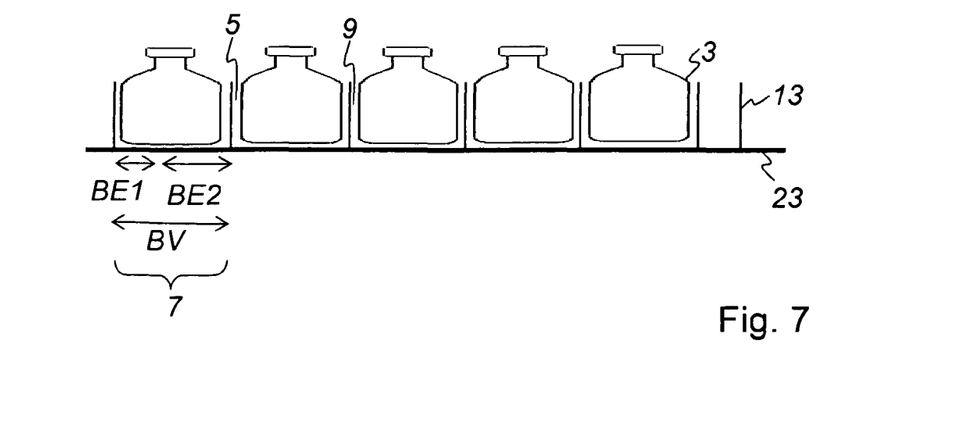
FIG. 7 shows a schematic top view of the portion of the transport device according to FIG. 4 with combined lanes according to the present invention.

FIG. 7 shows a schematic front view of the portion of the transport device 1 according to FIG. 4 with combined lanes 9 according to the present invention. The combined lanes 9 are formed by removing the inner separating elements 13 per group of lane 7 of two former single lanes 5, which are broader than the single lanes 5 so that in comparison with FIG. 6 even broader articles 3 can be transported in the combined lanes 9.

Figure 8:
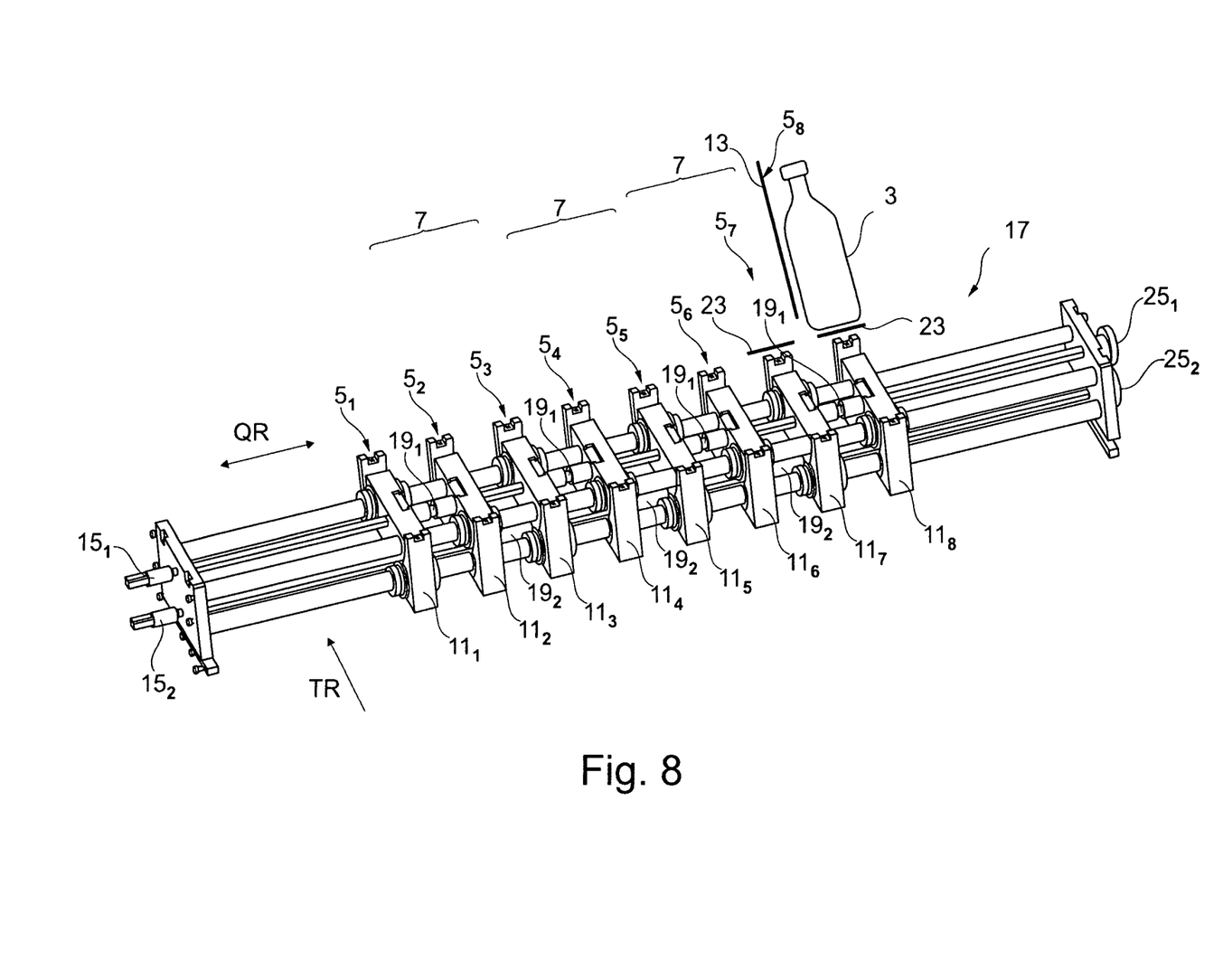
FIG. 8 shows a perspective view of a portion of an embodiment of the transport device according to the invention with two shafts and spindles in an initial position, wherein firstly the first shaft and after that the second shaft should be adjusted.

FIG. 8 shows a perspective view of a portion of an embodiment of the transport device 1 according to the invention with two shafts $15_1$ and $15_2$, at which four spindles $19_1$ and three spindles $19_2$ respectively are in turn arranged in each case in between the lane carriers $11_1$ to $11_8$. The respective lane carrier $11_i$ is assigned to a respective single lane $5_i$, i=1, ..., 8, which is not shown, however, but their positions are indicated only by arrows. An article 3 with a separating element 13 and two transport means 23 which are configured as single conveyor belts and are schematically shown for simplicity. The spindles $19_1$ and $19_2$ are designed drivable in the opposite sense. Thus, the separating elements 13 can be moved in pairs towards each other and/or moved apart from each other according to the rotation of one of the two shafts $15_1$ and $15_2$.

In FIG. 8 both shafts $15_1$ and $15_2$ are in an initial position before the adjustment of the widths BE of the single lanes 5 and before the adjustment of the widths BG of the groups of lanes 7. Therefore, the widths BE are the same for all single lanes 5 in FIG. 8.

Driving the spindles $19_1$ of the first shaft $15_1$ by a shaft adjusting unit $25_1$, three groups of lanes 7 result from this. Thereby, the single lanes $5_2$ and $5_3$ form a group of lane 7, the single lanes $5_4$ and $5_5$ form the next group of lane 7 and the single lanes $5_6$ and $5_7$ form the final group of lane 7. The single lanes $5_1$ and $5_8$ belong not to a group of lane 7. Afterwards the spindles $19_2$ of the second shaft $15_2$ are adjusted by using a shaft adjusting unit $25_2$. Thus, the widths BE of the single lanes 5 within each of the three groups of lanes 7 are adjusted and the desired widths BE of the single lanes 5 and/or the desired widths BG of the group of lanes 7 result from this.

According to the movement of each shaft 15, groups of lanes 7 are created so that the widths BG of the groups of lanes 7 and/or the widths BE of the single lanes 5 are the same.

Figure 9:
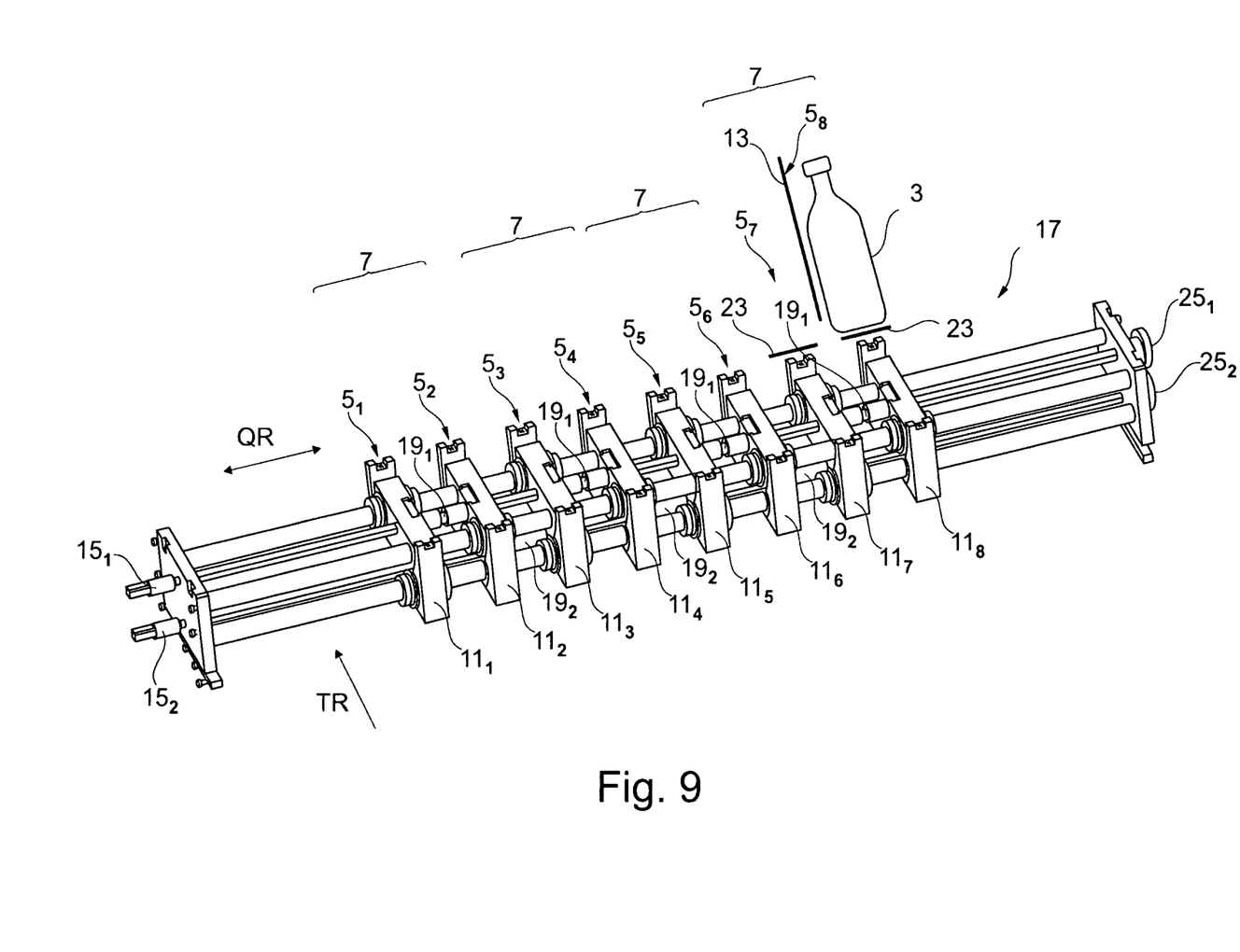
FIG. 9 shows a perspective view of the portion of the embodiment of the transport device according to the invention in the initial position according to FIG. 8, wherein firstly the second shaft is adjusted.

FIG. 9 shows a perspective view of the portion of the embodiment of the transport device 1 according to the invention subject to FIG. 8, wherein now firstly the second shaft $15_2$ and afterwards the first shaft $15_1$ are adjusted vice versa.

Hence, four other groups of lanes 7 thereof. The single lanes $5_1$ and $5_2$ form one group of lanes 7, the single lanes $5_3$ and $5_4$ form the next group of lanes 7, the single lanes $5_5$ and $5_6$ form the next group of lanes 7 and the single lanes $5_7$ and $5_8$ form the final group of lanes 7. All single lanes 5 thus now belong to a group of lanes 7.

Afterwards, the spindles $19_1$ of the first shaft $15_1$ are adjusted. Thus, the widths BE of the single lanes 5 within each of the four groups of lanes 7 are adjusted and the desired widths BE of the single lanes 5 and/or the desired widths BG of the groups of lanes result thereof.

Figure 10:
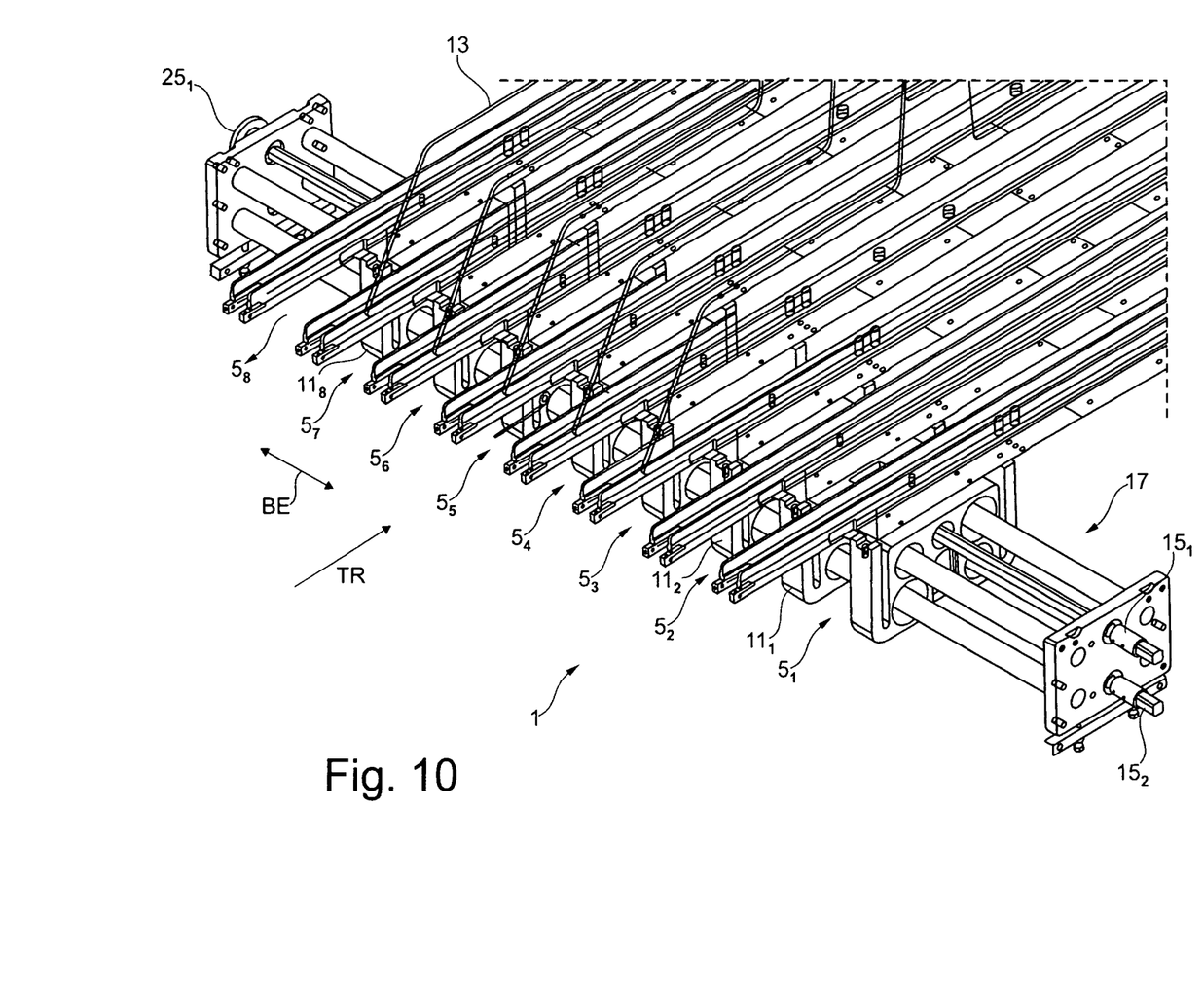
FIG. 10 shows a perspective view of the portion of the embodiment of the transport device according to the invention in the initial position according to FIG. 8, wherein separating elements are provided.

FIG. 10 shows a perspective view of the portion of the embodiment of the transport device 1 according to the invention in the initial position according to FIG. 8, wherein separating elements 13 are provided. The transport means 23 includes eight lane carriers $11_1, \ldots, 11_8$, which carry the articles 3 (not shown in FIG. 10) for further transport.

A single lane $5_i$ each is provided with the separating element $13_i$ and the lane carrier $11_i$, i=1, ..., 8. For adjusting the widths BE of the single lanes $5_i$ and the widths BG of the groups of lanes $7_j$ only the respective separating elements $13_i$ in the shown embodiment according to FIG. 10 must be appropriately connected with the lane carriers $11_i$ of the corresponding shaft $15_1$ or $15_2$ (see FIGS. 12 and 13).

Figure 11:
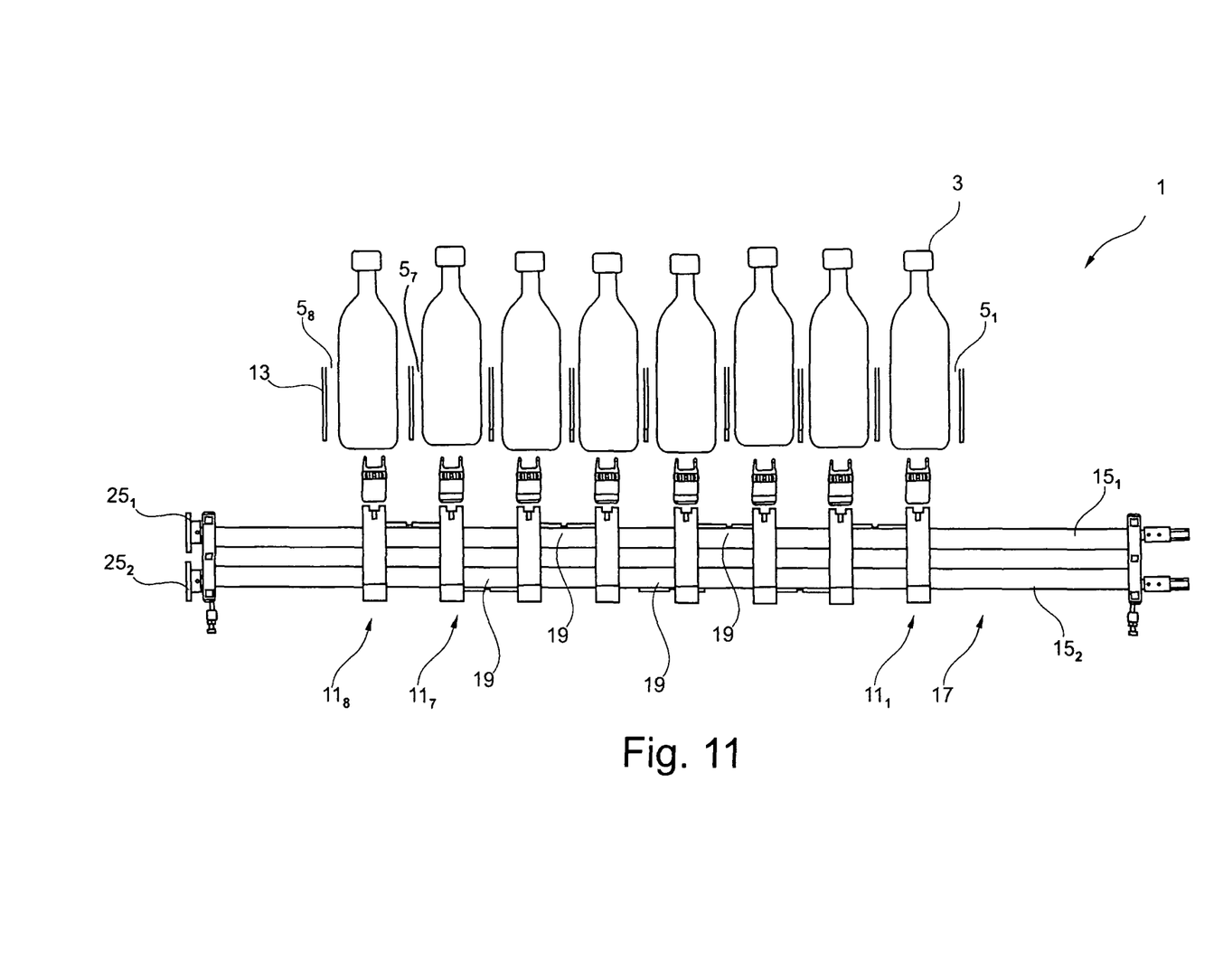
FIG. 11 shows a front view of the portion of the embodiment according to FIG. 10.

FIG. 11 shows a front view of the portion of the embodiment of the transport device 1 in the initial position according to FIG. 10. The single lanes $5_1, \ldots, 5_8$ are shown with consistently the same width BE, suitable to the articles 3 with consistent form and dimension.

Figure 12:
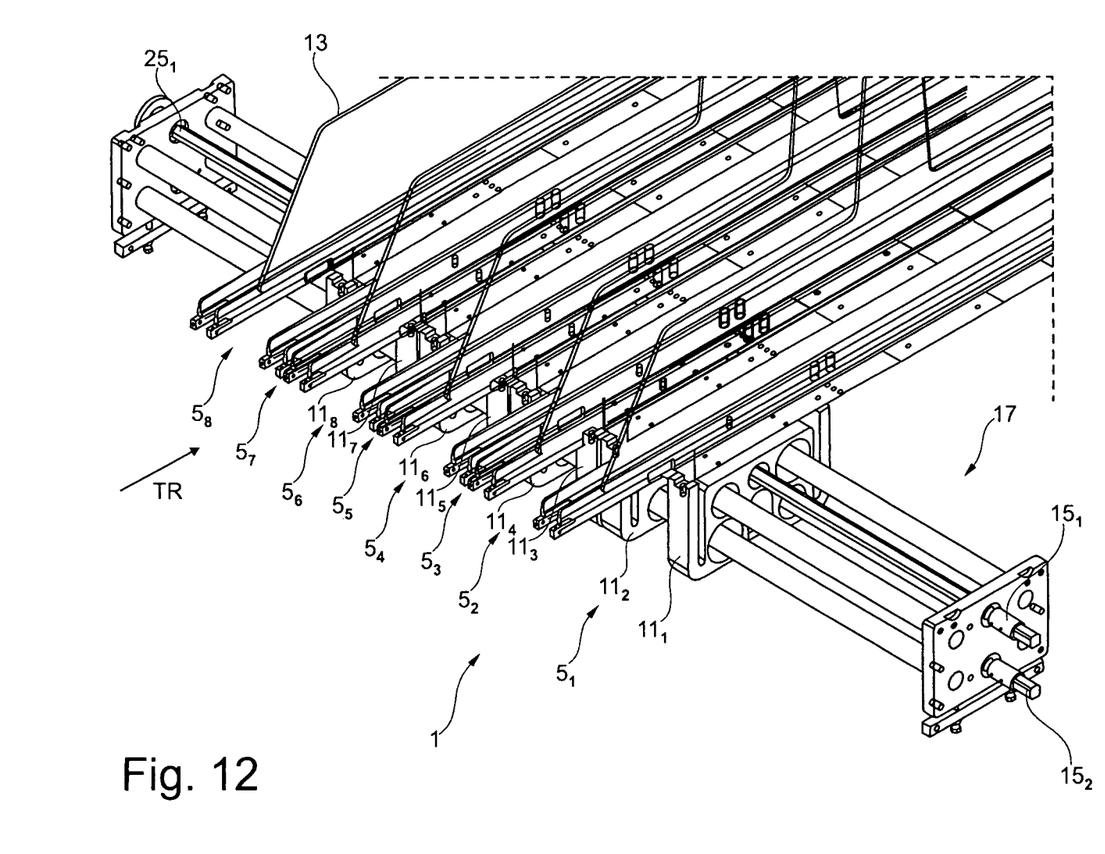
FIG. 12 shows a perspective view of the portion of the embodiment of the transport device according to the invention subject to FIG. 10 in an adjustment with combined lanes.

FIG. 12 shows a perspective view of the portion of the embodiment of the transport device 1 according to the invention subject to FIG. 10 in an adjustment, so that a narrow single lane $5_1$ for narrow articles $3s$ (see FIG. 13) is formed at one edge in transport direction TR of the transport device 1. The combined lanes 9 for the transport of broader articles $3b$ (see FIG. 13) are formed adjacent to it. The combined lanes 9 are formed of a group of lane 7 of two single lanes 6 according to the simple embodiment already described above.

Figure 13:
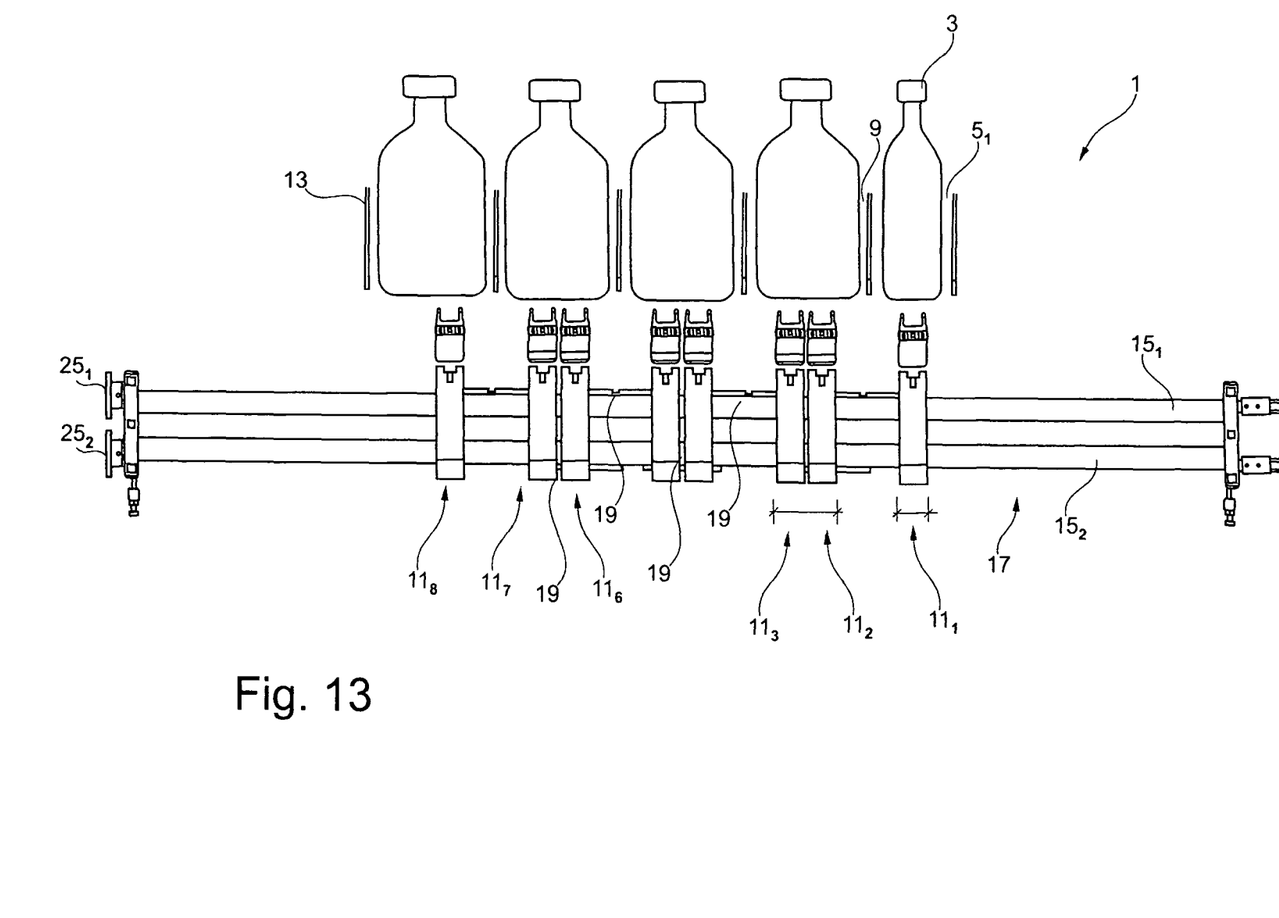
FIG. 13 shows a front view of the portion of the embodiment with the adjustment according to FIG. 12.

FIG. 13 shows a front view of the portion of the embodiment with the adjustment according to FIG. 12. For this purpose, the spindles 19 were appropriately adjusted at the two shafts 15 as already described in detail above.

The invention has basically been described with reference to a preferred descriptive embodiment. Embodiments with complex groupings of single lanes 5 were only briefly described. It is imaginable for a skilled person, however, that modifications or changes of the invention or other groupings of single lanes 5 are possible without leaving the scope of the following claims.

What is claimed is:

1. A transport device for the transport of articles, comprising:
    a plurality of article transport means configured as single conveyor belts, each single conveyor belt being assigned to a lane carrier;
    a separating element for each single conveyor belt providing a plurality of single lanes for transporting single articles, each of the single lanes having a width, each of the articles being consecutively arranged and transported in the single lanes, adjacent single lanes being separated by one of the separating elements;
    at least one displacing means for adjusting the respective widths of the single lanes in a transverse manner to a transport direction of the transport device;
    at least two adjacent single lanes form a group of lanes with a width; and
    at least one further displacing means for adjusting the respective widths of the groups of lanes in a transverse manner with respect to the transport direction; and
    wherein the at least one displacing means and the at least one further displacing means are arranged with respect to each other so that the respective widths of different single lanes within a respective group of lanes is adjustable to be the same and adjustable to be different and so that the respective groups of the single lanes formed in this manner are displaceable relatively,
    further comprising the lane carriers, each of the single conveyor belts resting on one of the lane carriers,
    wherein each of the separating elements is connected to one of the lane carriers, some of the lane carriers being movable by the at least one displacing means to adjust the respective widths of the single lanes, others of the lane carriers being movable by the at least one further displacing means to adjust the respective widths of the groups of lanes.

2. The transport device of claim 1, wherein the widths of the single lanes and/or the widths of the groups of lanes are steplessly variable with the displacing means and/or the at least further displacing means.

3. The transport device of claim 1, wherein the displacing means includes shafts with a plurality of spindles in each case, wherein the spindles are positioned on the shafts in such a way the spindles are situated in between the respective group of lanes.

4. The transport device of claim 3, wherein the spindles include in each case two portions drivable in the opposite sense.

5. The transport device of claim 1, wherein at least two single lanes of at least a group of lanes form a combined lane with a width, wherein the width of the combined lane is greater than the totaled widths of the at least two single lanes of the at least one group of lanes.

6. The transport device of claim 5, wherein the separating elements situated in between the single lanes of the combined lanes are removable in order to form the combined lanes.

7. The transport device of claim 1, wherein two single lanes form a group of lanes and wherein the transport device having a first shaft and a second shaft and the displacing means at the first shaft are positioned after all even-numbered single lanes and the displacing means at the second shaft are positioned after all odd-numbered single lanes.

8. A transport device for the transport of articles, comprising:
    a plurality of article transporters configured as single conveyor belts, each single conveyor belt being assigned to a lane carrier;
    a separating element for each single conveyor belt providing a plurality of single lanes for transporting single articles, each of the single lanes having a width, each of the articles being consecutively arranged and transported in the single lanes, adjacent single lanes being separated by one of the separating elements;
    at least one adjustor for adjusting the respective widths of the single lanes in a transverse manner to a transport direction of the transport device;
    at least two adjacent single lanes form a group of lanes with a width; and
    at least one further adjustor for adjusting the respective widths of the groups of lanes in a transverse manner with respect to the transport direction, wherein the at least one adjustor and the at least one further adjustor are arranged with respect to each other so that the respective widths of different single lanes within a respective group of lanes is adjustable to be the same and adjustable to be different and so that the respective groups of the single lanes formed in this manner are displaceable relatively to one another,
    further comprising the lane carriers, each of the single conveyor belts resting on one of the lane carriers,
    wherein each of the separating elements is connected to one of the lane carriers, some of the lane carriers being movable by the at least one adjustor to adjust the respective widths of the single lanes, others of the lane carriers being movable by the at least one further adjustor to adjust the respective widths of the groups of lanes.

9. The transport device as recited in claim 1 wherein the at least one further displacing means adjusts the respective widths of the groups of lanes independent of the adjustment of the respective widths of the single lanes by the at least one displacing means.

10. The transport device as recited in claim 1 wherein the separating elements include interior separating elements and each group of lanes includes one of the interior separating elements therein defining a first width of a first single lane of the group and a second width of a second single lane of the group, the at least one displacing means moving the interior separating elements together such that the first width increases by an amount that the second width decreases.

11. The transport device as recited in claim 10 wherein the separating elements include outer separating and each group of lanes are delimited by two of the outer separating elements, each group of lanes having a group width equal to at least the first width plus the second width, the at least one further displacing means moving the outer separating elements together such that the group width of each group of lanes varies.

12. The transport device as recited in claim 11 wherein the first and second widths are variable without varying the group width.

13. The transport device as recited in claim 11 wherein the at least one displacing means includes a plurality of spindles and an adjusting unit for moving the spindles and the at least one further displacing means includes a plurality of further spindles and a further adjusting unit for moving the spindles.

14. The transport device as recited in claim 13 wherein the adjusting unit moves the spindles to adjust the first and second widths and the further adjusting unit moves the further spindles to adjust the group width.

15. The transport device as recited in claim 14 wherein the adjusting unit and the further adjusting unit are operable independent of each other.

16. The transport device as recited in claim 1 wherein the groups of lanes are displaceable relative to one another.

17. The transport device as recited in claim 1 wherein the at least one displacing means and the at least one further displacing means are arranged with respect to each other to adjust the respective widths of different single lanes within a respective group of lanes by moving the separating elements between a first position in which the respective width of different single lanes within a respective group of lanes is the same and a second position in which the respective width of different single lanes within a respective group of lanes is different.

* * * * *